(12) United States Patent
Uttley et al.

(10) Patent No.: US 6,349,900 B1
(45) Date of Patent: Feb. 26, 2002

(54) ACTUATOR SYSTEM FOR AEROSPACE CONTROLS AND FUNCTIONS

(75) Inventors: Andrew E. Uttley; Peter William Chambers; Nigel Blackwell, all of Lancashire; Brian Weller, Preston, all of (GB)

(73) Assignee: BAE Systems plc, Farnborough (GB)

( * ) Notice: Subject to any disclaimer, the term of this patent is extended or adjusted under 35 U.S.C. 154(b) by 0 days.

(21) Appl. No.: 09/695,055

(22) Filed: Oct. 25, 2000

Related U.S. Application Data

(63) Continuation of application No. PCT/GB00/02943, filed on Aug. 31, 2000.

(30) Foreign Application Priority Data

Aug. 3, 1999 (GB) .............................................. 9918289

(51) Int. Cl.[7] ................................................. B64C 9/10
(52) U.S. Cl. ........................ 244/82; 244/76 A; 244/178
(58) Field of Search ............................. 244/75 A, 76 A, 244/82, 90 R, 178, 227, 228

(56) References Cited

U.S. PATENT DOCUMENTS

| | | | | |
|---|---|---|---|---|
| 2,568,719 A | | 9/1951 | Curry, Jr. ...................... 244/82 |
| 2,733,879 A | * | 2/1956 | Noxon ......................... 244/178 |
| 2,853,256 A | * | 9/1958 | Schmidt et al. ............ 244/82 X |
| 2,949,259 A | * | 8/1960 | Bell ......................... 244/178 X |
| 4,079,902 A | | 3/1978 | Ryzhko et al. ............. 244/75 R |
| 4,124,180 A | | 11/1978 | Wolowicz ..................... 244/82 |
| 4,648,569 A | | 3/1987 | Stewart ..................... 244/76 R |
| 4,676,460 A | * | 6/1987 | Hagy et al. ............. 244/178 X |
| 5,135,186 A | * | 8/1992 | Ako .......................... 244/75 A |
| 5,224,667 A | | 7/1993 | Lacabanne ................ 244/75 A |
| 5,366,176 A | | 11/1994 | Loewy et al. ............. 244/75 R |
| 5,913,492 A | | 6/1999 | Durandeau et al. ........... 244/82 |

FOREIGN PATENT DOCUMENTS

| | | |
|---|---|---|
| EP | 0 807 573 | 11/1997 |
| FR | 1069933 | 7/1954 |

OTHER PUBLICATIONS

Thompson, Ken; "The Electric Control of Large Aeroplanes" IEEE 987 National Aerospace and Electronics Conference Naecon 1987, vol. 2, May 1987, pp. 595–601.

* cited by examiner

*Primary Examiner*—Robert P. Swiatek
(74) *Attorney, Agent, or Firm*—Nixon & Vanderhye P.C.

(57) ABSTRACT

An actuator system (10, 100, 200) for use in an aircraft control or operating system, comprising a controller (12) operable in response to an input for generating a control signal, and an electrical actuator (20) responsive to the control signal for operating an aircraft flight control surface or other aircraft apparatus. A tab (24; 124) for aerodynamically assisting the electrical actuator is also provided in order to reduce the load on the electrical actuator in use.

13 Claims, 3 Drawing Sheets

ACTUATOR SYSTEM FOR AEROSPACE CONTROLS AND FUNCTIONS

This is a continuation of PCT application No. PCT/GB00/02943, filed Aug. 13, 2000, the entire content of which is hereby incorporated by reference in this application.

BACKGROUND OF THE INVENTION

1. Field of the Invention

The present invention concerns actuator systems for aerospace controls and other aerospace functions. In particular, the invention concerns an actuator system for operating the aerodynamic control surfaces of an aircraft such as the ailerons, the wing leading edge and trailing edge flaps and slats, i.e. the flaperons, the elevators, the spoilers and the rudder. The actuator system of the present invention may also be employed for controlling the airbrakes, arrester hook, flight re-fuelling probe, the undercarriage or pallets, and the doors and locks generally.

2. Discussion of Prior Art

Actuator systems for operating aircraft control surfaces and for performing other aerospace functions are well known. Early such systems were in the form of mechanical linkage and lever arrangements operated manually by means of a control column or rudder bar by which the pilot could directly adjust the deflection of the aerodynamic control surfaces, for example.

Then, as aircraft increased in size and speed, additional force was required to operate the aerodynamic control surfaces, and various developments ensued.

The first of these involved the mounting of devices known as control tabs on the aerodynamic control surfaces themselves. Such tabs were in the form of small auxiliary control surfaces operated by the pilot and arranged in use to generate automatically an aerodynamic force designed to assist in moving the main control surface in the manner desired. In this way, the control tabs served to amplify aerodynamically the pilot's effort for application to the main control surface, or they served to reduce the resistance to movement of the main control surface, in situations or aircraft where direct operation by the pilot would otherwise be impractical.

There were, however, a number of drawbacks to the use of control tabs, the most significant being potential risks of control surface flutter at resonant frequencies and potential shock wave problems at aircraft velocities approaching sonic conditions. Flutter arises from a structural interaction between the aircraft frame and the control surface resulting in a relative oscillatory movement between them, which becomes exacerbated as resonant frequencies are approached.

Consequently, alternative actuator systems were developed for enabling the pilot to move the control surfaces, such systems constituting either power-assisted control systems or power-operated control systems. In both cases, the power was provided by hydraulic actuators, comprising pumps driven from the main aircraft engine(s) and hydraulic jacks or piston and cylinder arrangements connected by fluid lines to the relevant pumps. In a power assisted control system, the pilot still employs a control column or rudder bar for operating the control surface, and the hydraulic jacks are arranged in such a way as to assist his efforts. In a power-operated control system, the pilot simply operates switches and valves to actuate the hydraulic jacks which themselves actuate the control surfaces.

The hydraulic actuators employed in such power-assisted and power-operated control systems are capable of producing high forces, and the necessary hinge moments for deflecting the control surfaces can readily be generated within relatively small space requirements. However, hydraulic systems are prone to leakage and wear, and ensuring that they remain at all times in a satisfactory operating condition requires a high level of maintenance.

This has led to attempts to produce electrically powered actuation systems. A number of proposals have been put forward and are employed in limited applications, but hitherto no satisfactory electrically powered actuation system has yet been produced.

One currently available electrical arrangement features an electro-hydraulic actuator, comprising an electrical power source driven from the main aircraft propulsion engine(s) and a hydraulic actuator arranged to be operated by the electrical power source for deflecting the control surfaces. This system suffers from all of the disadvantages of the known hydraulic actuator systems, together with the additional problems that the power source has a high mass, is expensive to produce and requires a substantial amount of aircraft space.

Another electrical arrangement currently available features a conventional electric motor driven from the main aircraft propulsion engine(s) together with a gearbox/ball screw and mechanical linkage to provide the required force and stroke for operating the control surfaces. Such arrangements suffer from problems of wear and a tendency to jam, which is a significant drawback considering the safety requirements in aircraft flight.

A further difficulty in employing electrical actuation systems for aircraft control surfaces concerns the dissipation of heat, particularly for high load, high duty cycle devices, especially in the kinds of environment in which many actuators are required to function. By way of example, the flaperon actuators of a fast jet will typically be located in an unconditioned wing bay having an ambient temperature of the order of 90° C. In hydraulic actuators, the oil employed for driving them can also be used for cooling purposes and the same pipework can serve for both functions. The majority of the heat generated is thus removed by the circulating hydraulic fluid and is simply cooled by an additional fuel cooled oil cooler. By contrast, an electric actuator requires a separate cooling system, including separate piping and cooling fluid as well as a cooler, and this adds to the bulk of the actuator system.

Current efforts to introduce electrical actuation systems for aircraft control surfaces have to a large extent been based simply on replacing the existing hydraulic actuators with electric actuators. However, as indicated above, this leads to a new set of problems. For a similar power and duty cycle, a change from hydraulic actuation to electrical actuation will result in:

Significantly increased actuator cooling problems

Increased space requirements

Increased actuator mass

Increased actuator cost.

Another problem concerns the power requirements for the currently proposed and available electrical actuators. Such an actuator when employed to operate the flaperons of a modern fast jet typically requires a power supply of the order of 270 volt DC and draws peak currents between 100 and 150 amperes. This poses a significant safety risk in passenger applications.

SUMMARY OF THE INVENTION

It is an aim of the present invention to provide an actuator system which overcomes the above problems.

Its is also an aim of the present invention to provide an actuator system employing an electrical actuator which is compact and reliable and in which cooling requirements and power consumption are reduced.

According to the present invention, there is provided an actuator system for use in an aircraft control or operating system, comprising:

control means operable in response to an input for generating a control signal;

an electrical actuator responsive to the control signal for operating an aircraft flight control surface or other aircraft apparatus; and means for aerodynamically assisting the electrical actuator in order to reduce the load on the electrical actuator in use.

In a preferred form of the invention described below, the actuator system is employed for activating an aircraft flight control surface, and the electrical actuator constitutes a linear electric motor while the means for aerodynamically assisting the electrical actuator comprise a control tab incorporated in or mounted on the control surface.

As described, the linear electric motor may be mounted within the aircraft frame, that is within the fuselage or a wing, or it may be mounted in the control tab itself. The linear electric motor may be arranged to deflect the control tab directly or by means of a linkage mechanism, or it may be arranged to deflect servo tabs mounted on the control tab, again either directly or through a linkage mechanism.

Advantageously, the control means are arranged to receive feedback signals, for example relating to control surface position and acceleration, for generating an appropriate control signal to control tab acceleration. Such feedback signals may also represent the stroke position of the linear electric motor.

The present invention combines the advantages of a relatively low powered electrical actuator with aerodynamic amplification of, or an aerodynamic reduction in resistance to, the force required for operating the aircraft control surface or other apparatus. Potentially, this can enable very significant reductions in actuator mass and size, and in the cooling requirements and power consumption.

Linear electric motor technology offers simplicity, low wear, low maintenance and high accuracy. In particular, linear electric motors are capable of long strokes, fast response times, and a high degree of positional accuracy compared with existing aircraft actuators. Although the achievable output forces compared with known actuation techniques are relatively low, this is compensated by the use of aerodynamic amplification or other aerodynamic assistance, for example in the form of control tabs.

BRIEF DESCRIPTION OF THE DRAWINGS

The present invention is described further, by way of example, with reference to the accompanying drawings, in which.

DETAILED DISCUSSION OF PREFERRED EMBODIMENTS

Figure 1:
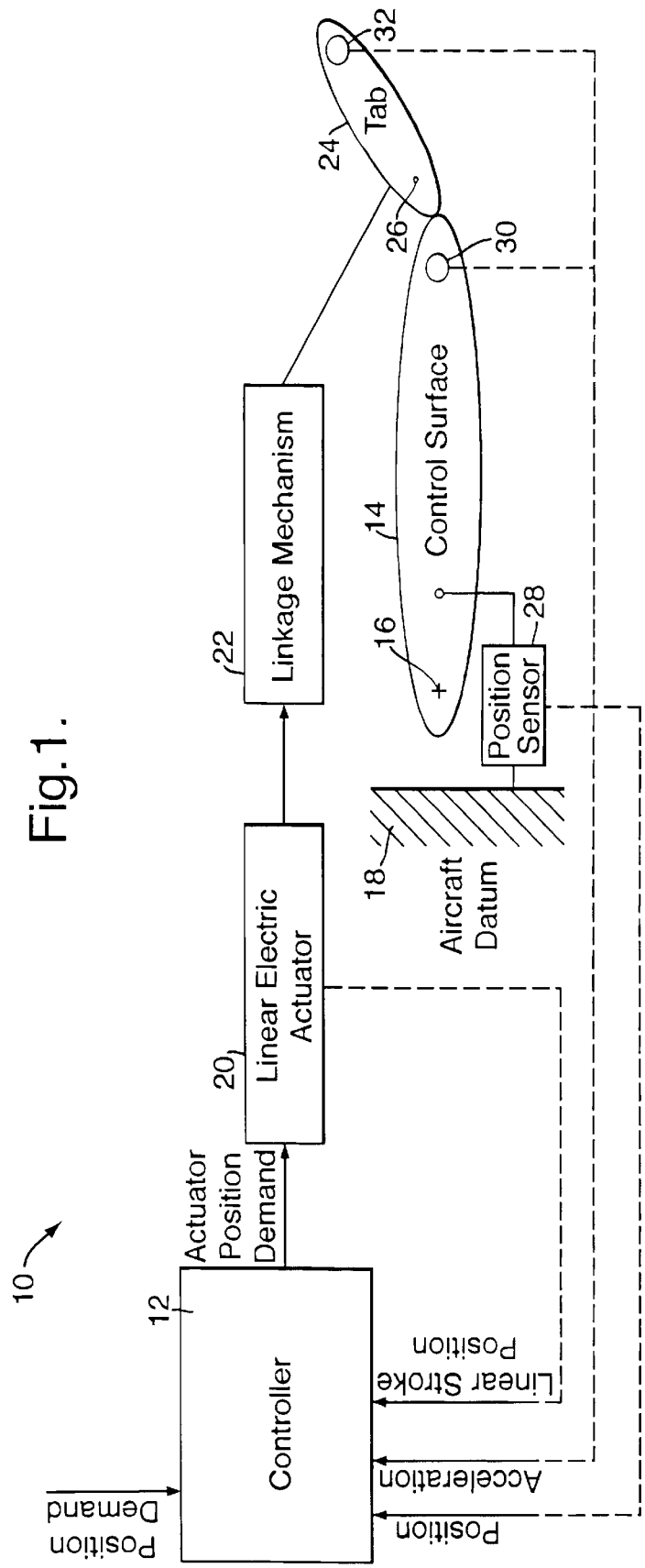
FIG. 1 is a diagrammatic view of a first embodiment of actuator system according to the present invention.

Referring initially to FIG. 1, this shows an actuator system 10 according to the present invention for operating an aircraft control surface, such as the ailerons, the wing leading edge and trailing edge flaps and slats, or flaperons, the elevators, the spoilers or the rudder. In the present instance, the control surface is an aileron or flaperon.

As shown, the actuator system 10 comprises a controller 12, which may be a part of the flight control computer or which may be a part of another aircraft system. The controller 10 is located within the frame of the aircraft for operating a control surface 14 attached by a main pivot 16 to a wing 18 of the aircraft. The pivot 16 is appropriately placed relative to the control surface 14 to provide a balanced mounting for the surface 14.

The controller 12 is connected to an electric actuator 20 in the form of a linear electric motor, wherein the shaft and armature comprise a moving slide or carriage running on an air gap above a flat stator. The electric actuator 20 is connected by way of a linkage mechanism 22 to a control tab 24, the control tab 24 being pivotally mounted by way of a hinge 26 on the control surface 14.

The controller 12 is arranged to receive an input signal from the pilot, which signal is in the form of a position demand providing an instruction for deflecting the control surface 14 to a new position. In response to such input, the controller 12 is arranged to generate a corresponding position control signal for operating the electric actuator 20.

The controller 12 is also arranged to receive as input signals feedback signals indicative of the movement of the control surface 14 and the control tab 24, for generating a flutter control signal as described below. More particularly, a position sensor 28 mounted between the aircraft wing 18 and the control surface 14 is arranged to supply signals to the controller 12 representing the current position of the control surface 14, and accelerometers 30, 32 mounted on the control surface 14 and control tab 24 respectively are arranged to supply to the controller 12 signals representing the current acceleration of the control surface 14 and the control tab 24. Finally, an additional position sensor (not shown) within the electric actuator 20 is arranged to supply to the controller 12 a signal representing the linear stroke position of the electric actuator 20. The position sensors and accelerometers employed here are all of a type known generally as rotary or linear variable differential transformers. However, potentiometers or Hall Effect devices may be used instead.

Operation of the actuator system 10 is as follows: On receipt of an input signal from the pilot, the controller 12 monitors the position and acceleration signals from the position sensor 28, the accelerometers 30, 32 and the sensor within the electric actuator 20 and generates a position control signal representing a new stroke position for the electric actuator 20. The electric actuator 20 responds, causing the linkage mechanism 22 to adjust the position of the control tab 24. The control tab 24 thus moves to a new position in which the aerodynamic forces acting on the control tab 24 generate a corresponding aerodynamic adjustment force acting on the control surface 14.

It will be appreciated that the combined effect of the force applied by the electric actuator 20 and the aerodynamic force applied by the controlled tab 24 serve together to generate a sufficient force to deflect the control surface 14 even in passenger aircraft or high speed jet aircraft. In other words, the control tab 24 serves in use as an aerodynamic amplifier of the force supplied by the electric actuator 20, in order to ensure that a sufficient moment is generated on the control surface 14 to deflect it on its hinge 16 by the required amount. Consequently, an electric actuator 20 having a relatively low output can be employed, thereby reducing the mass of the actuator, its space requirements, its cooling needs and its power consumption.

As aircraft speeds increase, and in particular as they approach sonic velocities, the aircraft wing 18, the control surface 14 and the control tab 24 may be subject to shock waves. At some speeds where the resonant frequency of the control surface approaches the aerodynamic excitation frequency, control surface flutter may also arise. In order to counteract these effects, two steps have been taken in the present actuator system 10:

Firstly, the stiffness of the control surface 14, including also the stiffness of the attachment of the control surface 14 to the wing 18, are made as high as possible. Likewise, the stiffnesses of the control tab 24 and its attachment to the control surface 14, as well as the actuator impedance, are made as high as possible. This has the effect of ensuring that the conditions at which resonance occur arise only at speeds above the normal speed range of the aircraft, so that control surface flutter is minimised.

Secondly, the control surface flutter is detected by means of the accelerometers 30, 32 and actively compensated by means of the controller 12. The controller 12 is arranged continually to monitor the outputs from the accelerometers 30, 32 and to generate a flutter control output accordingly to the electric actuator 20 for suppressing the flutter.

By employing an electric actuator 20 in the form of a linear electric motor, the actuator 20 will have a sufficiently high/wide bandwidth and high performance to be able to respond to such flutter control signals from the controller 12 in order to achieve an active adjustment and suppression of control surface flutter. If necessary, in order to increase the bandwidth of the electric actuator 20, a plurality of linear electric motors may be connected in parallel to the control tab 24. This has the additional advantage of providing failure redundancy and enhanced safety regulation. Alternatively, a multi-channel linear electric motor may be employed instead to increase the bandwidth.

Figure 2:
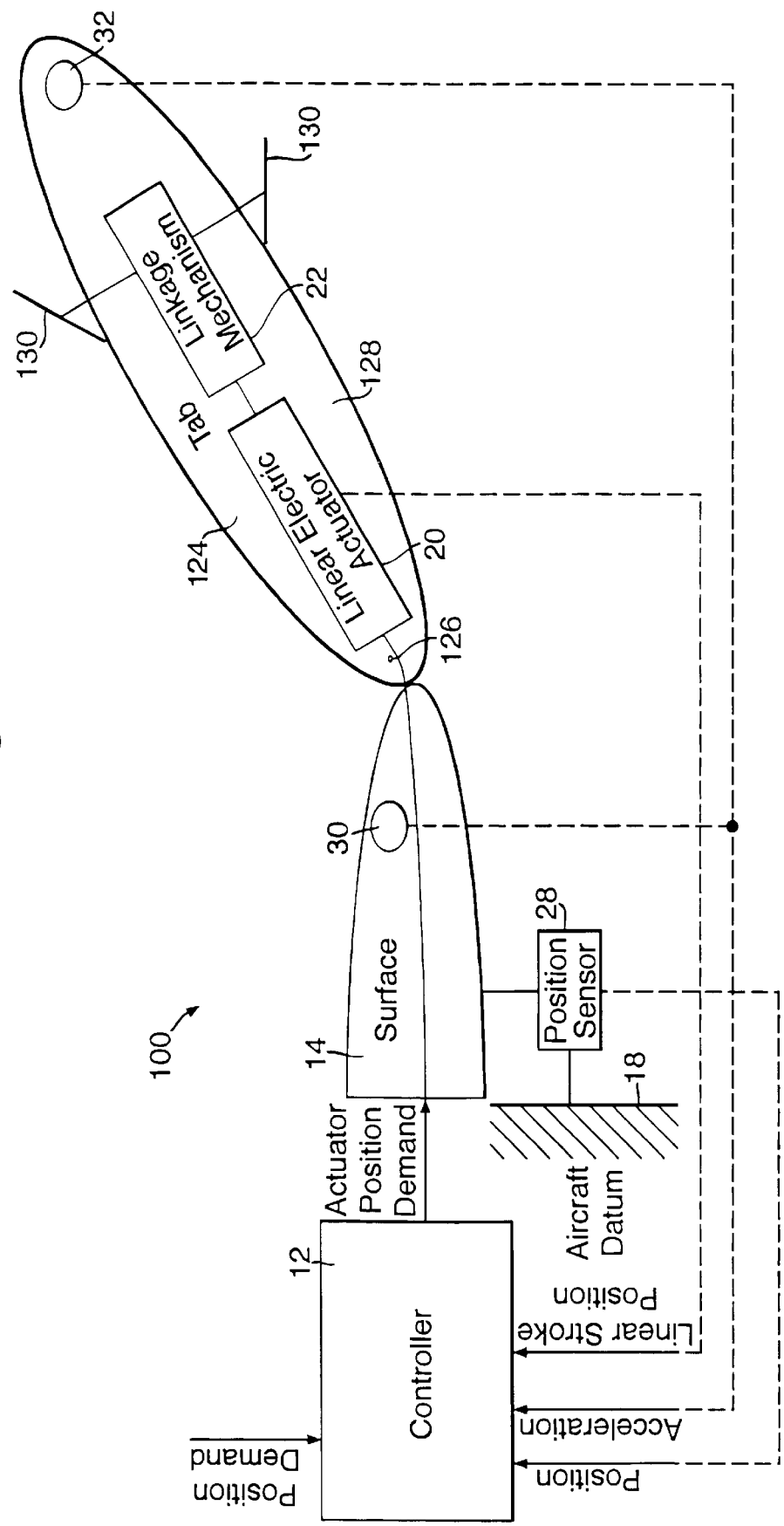
FIG. 2 is a diagrammatic view of a second embodiment of actuator system.

Turning now to FIG. 2, this shows a modified actuator system 100 operating on a similar principle to the actuator system 10 shown in FIG. 1. Similar parts are designated by the same reference numerals. Only the differences in design and operation will be described.

The actuator system 100 comprises a controller 12, as before, for operating a control surface 14 mounted on a wing 18 of an aircraft. The control surface 14 and its mounting on the wing 18 are identical to the arrangement shown in FIG. 1, although some of the details are omitted in FIG. 2.

In the present instance, the control tab 24 is replaced by a control tab 124 mounted on the control surface 14 by way of a hinge 126. The control tab 124 is a compound tab, comprising a main tab 128 and a pair of servo tabs 130 hingedly connected to the upper and lower surfaces of the main tab 128.

Another modification is that the electric actuator 20 and the linkage mechanism 22 are now housed within the main tab 128 of the control tab 124 rather than within the frame of the aircraft, and the linkage mechanism 22 is connected to the servo tabs 130.

The operation of the actuator system 100 is similar to the actuator system 10, except in that the actuator 20 and linkage mechanism 22 are arranged to deflect the servo tabs 130 rather than the control tab 124 as a whole. Such deflection thereby generates an aerodynamic force for deflecting the main control tab 128 and consequently the control surface 14.

Active flutter oppression is achieved in the same way as in the actuator system 10, by employing the signals from the accelerometers 30, 32 and generating an appropriate compensatory output from the controller 12.

Figure 3:
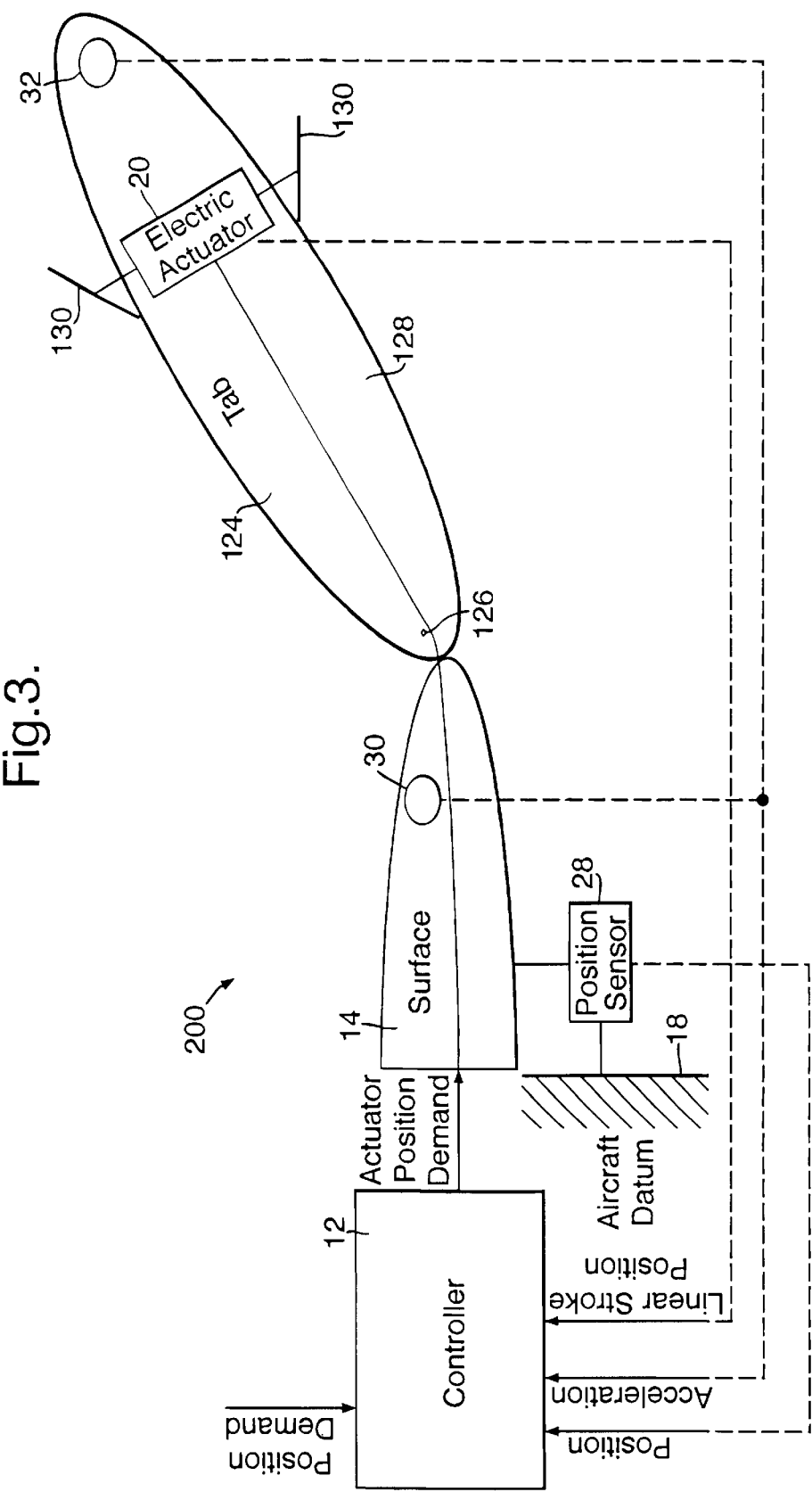
FIG. 3 is a diagrammatic view of a third embodiment of actuator system.

A further modification of the invention is shown in FIG. 3, which illustrates an actuator system 200 operating on a similar principle to the actuator system 10 shown in FIG. 1 and the actuator system 100 shown in FIG. 2. The same parts are designated by similar reference numerals, and only the differences will be described.

The actuator system 200 again comprises a controller 12 for operating a control surface 14, and a compound tab 124 is mounted on the control surface 14 by way of a hinge 126. As in the case of the FIG. 2 embodiment, the compound tab 124 comprises a main control tab 128 and a pair a servo tabs 130 hinged on the upper and lower surfaces of the main control tab 128.

In the FIG. 3 embodiment, the electric actuator 20 is again mounted within the compound tab 124, but in this instance the linkage mechanism 22 is omitted altogether. Instead, the electric actuator 20 is arranged to actuate the servo tabs 130 directly for the purpose of generating an aerodynamic force for deflecting firstly the main control tab 128 and subsequently the control surface 14.

In other respects, including in the provision of active flutter suppression, the actuator system 200 operates identically with the actuator system 100 in FIG. 2.

Various modifications are possible within the scope of the invention. For example, the described actuator systems may be employed for operating other control surfaces of the aircraft than those described, or even for other aircraft functions, including the operation of aircraft apparatus such as the undercarriage.

When employed for operating the control surfaces of the aircraft, the actuator system may comprise alternative forms of control tab, for example a control tab which is an integral part of the control surface and which is effective by virtue of the control surface having an offset main pivot. Alternative means other than a control tab may even be employed for aerodynamically amplifying the output of the linear electric actuator.

The described embodiments all feature a linear electric actuator arranged to operate the control or servo tabs. However, for reasons of redundancy or safety, the same or an additional linear electric actuator may also be arranged to operate the control surface itself.

Another possibility is for the described linear electric actuator to operate the control surface directly, while a mechanism between the control surface and the control tab operates the control tab.

The present invention offers a significant advance in aircraft control in terms of flexibility, reliability and performance. The need for maintenance is likely to be significantly reduced by comparison with known hydraulic actuators, and the costs of production and operation are expected to be highly advantageous.

What is claimed is:

1. An actuator system for use in an aircraft control system having a flight control surface, comprising:
   control means operable in response to an input for generating a control signal,
   an electrical actuator responsive to the control signal, said actuator comprising a linear electric motor operating said flight control surface, and
   means for aerodynamically assisting the actuator in operating said flight control surface in order to reduce the load on the electric motor.

2. An actuator system according to claim 1 wherein the aerodynamic assistance means comprise a control tab forming a part of the control surface and obtained by mounting the control surface on the associated section of the aircraft by means of an offset hinge.

3. An actuator system according to claim 1 wherein the aerodynamic assistance means comprise a control tab mounted on the control surface.

4. An actuator system according to claim 3, wherein the control tab comprises a compound control tab having a main tab connected by means of a hinge to the control surface, and one or more servo tabs pivotably connected to the main tab.

5. An actuator system according to claim 1, wherein the electrical actuator is connected to a control tab for operating the control surface.

6. An actuator system according to claim 5, wherein the actuator is connected to the control surface for operating the same.

7. An actuator system according to claim 1, wherein the linear electrical motor is mounted with the control tab.

8. An actuator system according to claim 1, further including feedback means for generating signals representing the condition of the aircraft control surface for providing an input to the control means.

9. An actuator system according to claim 8, wherein the feedback means comprise at least one of a position sensor associated with the control surface, and an accelerometer associated with at least one of the control surface and the control tab.

10. An actuator system according to claim 1, further including means for suppressing flutter of the control surface, the flutter suppression means comprising means for generating signals representing the movement of the control surface.

11. An aircraft including an actuator system according to claim 1.

12. An actuator system for use in an aircraft control system having a flight control surface, said actuator system comprising:

control means responsive to an input, for generating a control signal, an electrical actuator responsive to the control signal, the electrical actuator comprising a linear electric motor arranged to operate the flight control surface, and a control tab on said flight control surface for assisting the linear electric motor in operating the flight control surface and reducing the load on the linear electric motor.

13. An actuator system for use in an aircraft operating system, said actuator system comprising:

control means, responsive to an input, for generating a control signal, an electrical actuator responsive to the control signal, the electrical actuator comprising a linear electric motor arranged to operate an aircraft apparatus associated with the operating system, and means for aerodynamically assisting the linear electric motor in operating the aircraft apparatus to reduce the load on the electric actuator.

* * * * *

UNITED STATES PATENT AND TRADEMARK OFFICE
CERTIFICATE OF CORRECTION

PATENT NO.    : 6,349,900 B1
DATED         : February 26, 2002
INVENTOR(S)   : Uttley et al.

It is certified that error appears in the above-identified patent and that said Letters Patent is hereby corrected as shown below:

<u>Title page,</u>
Item [63], Related U.S. Application Data should read:

-- Continuation of application No. PCT/GB00/02943, filed on July 31, 2000 --

Signed and Sealed this

Twenty-fourth Day of December, 2002

JAMES E. ROGAN
*Director of the United States Patent and Trademark Office*